(12) United States Patent
Gadkaree et al.

(10) Patent No.: US 8,002,921 B2
(45) Date of Patent: Aug. 23, 2011

(54) ELECTRODES FOR ELECTRIC DOUBLE LAYER DEVICES

(75) Inventors: Kishor Purushottam Gadkaree, Big Flats, NY (US); Joseph Frank Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 576 days.

(21) Appl. No.: 12/129,208

(22) Filed: May 29, 2008

(65) Prior Publication Data
US 2009/0294081 A1 Dec. 3, 2009

(51) Int. Cl.
*D21H 27/38* (2006.01)
*D21H 13/02* (2006.01)
*H01M 4/133* (2010.01)

(52) U.S. Cl. ........ 156/138; 162/135; 162/124; 162/125; 162/102; 162/132; 162/146; 162/181.9; 429/231.8; 264/105; 427/58; 502/101

(58) Field of Classification Search ................ 162/135, 162/138, 141, 146, 123–132, 102, 181.1, 162/181.9; 361/502–505, 523–525; 429/303, 429/217, 231.8; 264/105, 210.2, 210.6, 280; 427/58; 502/101; 204/242, 293
See application file for complete search history.

(56) References Cited

U.S. PATENT DOCUMENTS

| | | | | |
|---|---|---|---|---|
| 2,999,788 A * | 9/1961 | Morgan | | 162/146 |
| 3,307,969 A * | 3/1967 | Quinn | | 523/159 |
| 3,650,954 A * | 3/1972 | Yasuda et al. | | 162/135 |
| 3,730,830 A * | 5/1973 | Driscoll | | 162/146 |
| 4,313,972 A * | 2/1982 | Goller et al. | | 427/113 |
| 4,851,304 A * | 7/1989 | Miwa et al. | | 429/534 |
| 5,213,865 A * | 5/1993 | Yamada | | 428/92 |
| 5,584,977 A | 12/1996 | Bachot et al. | | 204/291 |
| 5,646,815 A * | 7/1997 | Owens et al. | | 361/502 |
| 5,907,472 A * | 5/1999 | Farahmandi et al. | | 361/502 |
| 5,956,225 A * | 9/1999 | Okuyama et al. | | 361/502 |
| 6,201,685 B1 | 3/2001 | Jerabek et al. | | |
| 6,212,062 B1 | 4/2001 | Day et al. | | |
| 6,225,733 B1 | 5/2001 | Gadkaree et al. | | 1/2 |
| 6,304,426 B1 | 10/2001 | Wei et al. | | 9/155 |
| 6,383,427 B2 | 5/2002 | Ishikawa et al. | | |
| 6,487,066 B1 | 11/2002 | Niiori et al. | | |
| 6,631,074 B2 | 10/2003 | Bendale et al. | | 9/45 |
| 6,656,701 B2 | 12/2003 | Bishop et al. | | 1/37 |
| 6,714,391 B2 | 3/2004 | Wilk et al. | | 2/12 |
| 6,738,252 B2 | 5/2004 | Okamura et al. | | 31/12 |
| 7,144,476 B2 * | 12/2006 | Wilde et al. | | 162/138 |
| 7,160,615 B2 | 1/2007 | Iwaida et al. | | 5/16 |
| 7,236,349 B2 | 6/2007 | Miyaki et al. | | |
| 7,295,423 B1 | 11/2007 | Mitchell et al. | | |
| 7,297,300 B2 | 11/2007 | Ozaki et al. | | |
| 7,663,863 B2 * | 2/2010 | Maruyama et al. | | 361/502 |
| 2003/0148187 A1 * | 8/2003 | Yamaguchi et al. | | 429/245 |
| 2003/0194557 A1 * | 10/2003 | Wilde et al. | | 428/408 |
| 2004/0085710 A1 | 5/2004 | Takeuchi et al. | | |
| 2004/0170821 A1 | 9/2004 | Iwaida et al. | | 2/12 |
| 2007/0154771 A1 * | 7/2007 | Jang et al. | | 429/38 |
| 2008/0024954 A1 | 1/2008 | Gadkaree et al. | | |
| 2008/0117562 A1 * | 5/2008 | Maruyama et al. | | 361/502 |
| 2008/0268297 A1 * | 10/2008 | Quayle et al. | | 429/12 |
| 2009/0280409 A1 * | 11/2009 | Mogi et al. | | 429/217 |
| 2009/0294081 A1 * | 12/2009 | Gadkaree et al. | | 162/157.5 |
| 2010/0151328 A1 * | 6/2010 | Gadkaree et al. | | 429/231.8 |
| 2010/0263533 A1 * | 10/2010 | Gadkaree et al. | | 95/134 |
| 2011/0002086 A1 * | 1/2011 | Feaver et al. | | 361/502 |

FOREIGN PATENT DOCUMENTS

| | | |
|---|---|---|
| EP | 0 630 870 | 12/1994 |
| EP | 674937 A2 * | 10/1995 |
| JP | 08119615 A * | 5/1996 |
| WO | WO 2008013711 A2 * | 1/2008 |

* cited by examiner

*Primary Examiner* — José A Fortuna
(74) *Attorney, Agent, or Firm* — Joseph M. Homa

(57) ABSTRACT

The disclosure provides a method comprising contacting a fibrous polymeric material and a carbon material to form a mixture, contacting the mixture with a liquid to form a slurry, and then forming a layer comprising the slurry. Also disclosed are layers formed from the recited methods, electrodes comprising the layers, and electrical devices comprising the layers and/or electrodes.

20 Claims, 1 Drawing Sheet

ELECTRODES FOR ELECTRIC DOUBLE LAYER DEVICES

BACKGROUND

1. Field

The present disclosure relates to methods of manufacturing a carbon and fibrous polymer composition suitable for use in electrodes and other components in electrical devices, such as electric double layer capacitors.

2. Technical Background

High density energy storage devices, such as electric double layer capacitors, have been the subject of considerable research. An electric double layer capacitor or EDLC is a type of capacitor that typically contains carbon electrodes separated by a porous separator, current collectors, and an electrolyte solution. When an electric potential is applied to an EDLC, ionic current flows due to the attraction of anions to the positive electrode and cations to the negative electrode. This ionic current flow generates an electric charge that is stored at the interface between each polarized electrode and the electrolyte solution.

The design of an EDLC can vary depending on the intended application and can include, for example, standard jelly roll designs, prismatic designs, honeycomb designs, hybrid designs, or other designs known in the art. The energy density and the specific power of an EDLC can be affected by the properties of the components comprising the EDLC, including the electrode and the electrolyte utilized. With respect to the electrode, high surface area carbons, carbon nanotubes, other forms of carbon, and composite materials have conventionally been utilized in manufacturing such devices.

Carbon materials for EDLC electrodes are traditionally coated and/or deposited onto a current collector or other substrate. To produce stable and uniform dispersions, such carbon materials are typically mixed with a binder, such as, for example, polyvinylidene fluoride (PVDF). For example, in a conventional process, a slurry of a carbon material and a binder, such as, for example, PVDF, can be coated onto a graphite coated aluminum current collector, wherein the slurry coating is typically exposed to heat and/or vacuum to remove any liquid that can be present. The use of a binder material, such as PVDF, can increase the processing time required to prepare an electrode, lead to contamination, and can result in large internal resistance, thus decreasing the performance achievable for a given electrode structure.

Thus, there is a need to address the aforementioned problems and other shortcomings associated with the traditional electric double layer capacitors. These needs and other needs are satisfied by the carbon compositions and methods of the present invention.

SUMMARY OF THE INVENTION

The present disclosure relates to methods of manufacturing a carbon and fibrous polymer composition suitable for use in electrodes and other components in electrical devices, such as electric double layer capacitors. The present disclosure addresses at least a portion of the problems described above through the use of a novel carbon and fibrous polymer composition.

In a first aspect, the present disclosure provides a method comprising contacting a fibrous polymeric material and a carbon material to form a mixture, contacting the mixture with a liquid to form a slurry, and then forming a layer comprising the slurry.

In a second aspect, the present disclosure provides a method, as described above, wherein the fibrous polymeric material comprises polytetrafluoroethylene.

In a third aspect, the present disclosure provides a layer produced by the method described above.

In a fourth aspect, the present disclosure provides an electrode and/or a device comprising the layered composition produced by the method described above.

Additional aspects and advantages of the invention will be set forth, in part, in the detailed description and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate several aspects described below. Like numbers represent the same elements throughout the figures.

DETAILED DESCRIPTION OF THE INVENTION

Figure 1:
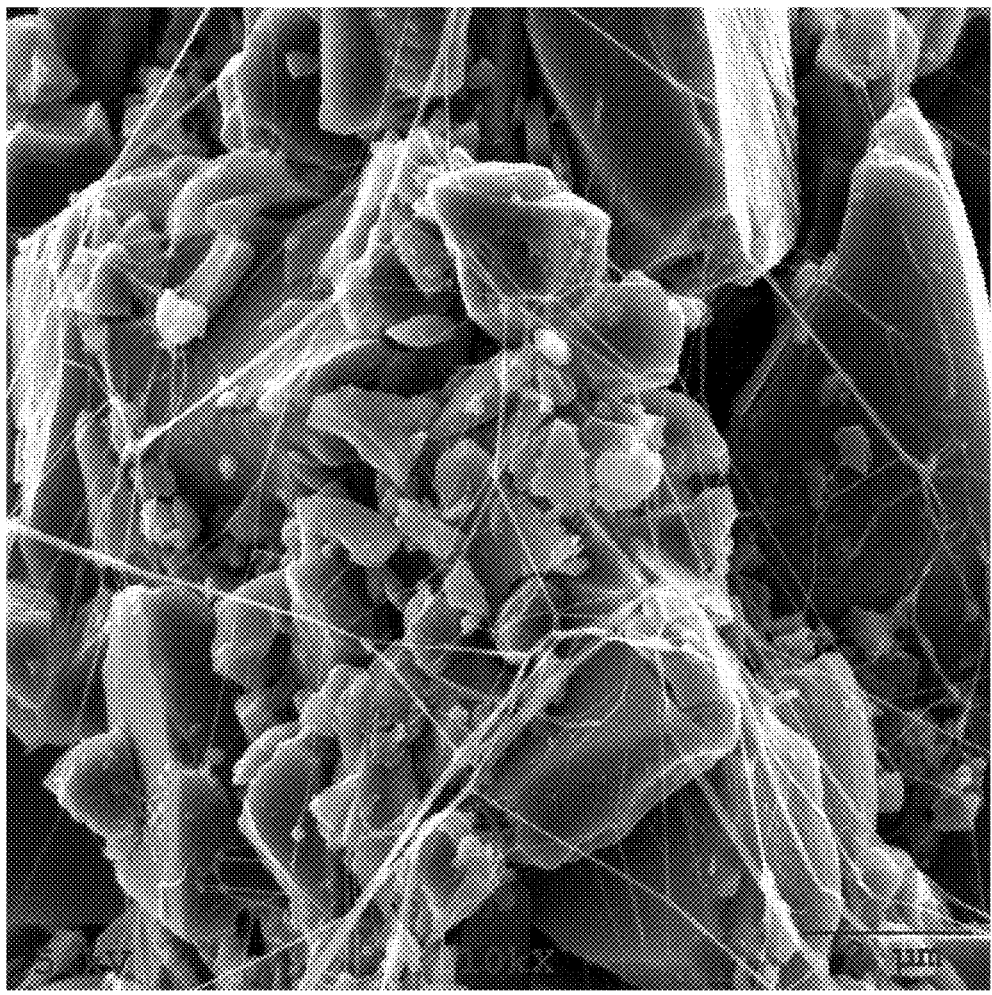
FIG. 1 is an electron micrograph of a mixture of carbon and fibrous PTFE material, after rolling, in accordance with various aspects of the present disclosure.

The present invention can be understood more readily by reference to the following detailed description, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "compound" includes aspects having two or more such compounds, unless the context clearly indicates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, an electric double layer capacitor or "EDLC" refers to any device configured to store a charge including, for example, a supercapacitor, an ultracapacitor, a device having a standard jelly roll design, a prismatic design, a honeycomb design, a hybrid design, or other designs known in the art.

As used herein, the terms "mix" or "mixing" are intended to refer to contacting of materials so as to provide a mixture. It is not required that a mixture be homogeneous or that any of the components of a mixture be distributed throughout a mixture in a uniform manner.

As used herein, the term "powder" is intended to refer to a plurality of discrete particles. It is not required that a powder or any one or more discrete particles forming such a powder comprise any given composition, have any specific morphology, or be free flowing.

As used herein, the term "network" is intended to refer to one or more fibrous elements attached to each other at intervals that can at least partially entangle a particle. In various aspects, a network can form and/or resemble a web, such as, for example, a spider web or cob web, and/or can have a mesh like structure. It is not necessary that a network comprise any given shape or form, or that any one or more elements be connected at regular intervals.

As briefly introduced above, the present disclosure provides a method for manufacturing a carbon and fibrous polymer composition suitable for use in, for example, electrodes and other components in electrical devices, such as, for example, an electric double layer capacitor.

Conventional manufacturing methods for electrodes can comprise forming a slurry of a carbon material, a liquid, and a binder, such as, for example, PVDF. The slurry can be coated onto a commercially available graphite coated aluminum current collector and subsequently exposed to heat and/or vacuum to remove the liquid. Other methods comprise the use of particulate PTFE materials which require substantial heat, for example, to 250° C., to sinter the PTFE materials and provide sufficient strength to the electrode structure. The high porosity typical of such conventionally prepared electrodes and the high temperatures necessary to prepare such electrodes are undesirable and can result in lower energy densities as compared to the compositions and methods disclosed herein. In addition, adhesives are typically utilized to bond the electrode tape to current collectors. Such adhesives can result in high internal resistance within the electrode structure. Still other conventional methods comprise the use of techniques to fibrilize a dry mixture of particulate PTFE and carbon, but these methods can produce agglomerated particles and non-uniform electrodes that require high heat in order to attach the electrodes to a current collector.

The methods of the present disclosure, in various aspects, comprise contacting a fibrous polymeric material and a carbon material to form a mixture, contacting the mixture with a liquid to form a slurry, and then forming a layer comprising the slurry. Other variations and optional steps can also be incorporated into the methods, as described herein, depending on the specific components and intended application of the resulting material. The use of a fibrous polymeric material in the methods as described herein can provide an entangled mass of carbon, suitable for use in, for example, an electrode structure, without other binder materials and/or processing steps that can result in handling and/or performance problems.

The fibrous polymer material of the present disclosure can be any fibrous polymeric material suitable for use in the methods described herein. In one aspect, the fibrous polymer material can, upon contacting with a carbon material, form a network.

In one aspect, the fibrous polymer material can comprise a plurality of individual fibers and/or bundles of fibers. In another aspect, at least a portion of the plurality of individual fibers have an aspect ratio greater than about one. In yet other aspects, a substantial portion, for example, about 20, 30, 40, 50, 60, 70, 80, 90, 95, or 99 wt. %, of the fibers have an aspect ratio greater than about one. In still other aspects, the aspect ratio of any one or more individual fibers can be greater than about 1, 2, 4, 5, 8, 10, 20, 30, 50 or more. While not wishing to be bound by theory, it is believed that fibers having a high aspect ratio, such as, for example, greater than about 1, can form entanglements when contacted (for example milled) with, for example, a carbon material. In contrast, fibers not having an aspect ration greater than about one can form a free flowing mass without entanglements. In another aspect, the fibrous polymeric material can comprise a polymeric material having a plurality of individual portions thereof that are interconnected and/or entangled so as to form a network and/or web. It should be noted that it is not necessary for the fibrous polymer material to comprise discrete and/or divided individual fibers, and at least a portion of the fibrous polymer material can be bundled.

In one aspect, the fibrous polymer material of the present disclosure is free of or substantially free of agglomerates and/or clumps of polymer material. In another aspect, at least a portion of the fibrous polymer material is free of or substantially free of agglomerates and/or clumps of polymer material.

The fibrous polymer material of the present disclosure can comprise any polymeric material suitable for use in, for example, an electrode. In one aspect, the fibrous polymer material comprises polytetrafluoroethylene (PTFE). In a specific aspect, the fibrous polymer material comprises TEFLON® 613A, available from E. I. du Pont de Nemours and Company (e.g., DuPont Fluoroproducts, Wilmington, Del., USA). In other aspects, the fibrous polymer material can comprise other polymeric materials. In yet other aspects, the fibrous polymer material can optionally be in a composition that comprises other components, such as, for example, a binder, processing aid, inorganic filler, coating, or a combination thereof.

The fibrous polymer material of the present disclosure can be present in any suitable amount depending on the specific components utilized and the intended application of the resulting composition. In one aspect, the amount of fibrous polymer material present is sufficient to form a network and/or entanglement with at least a portion of the carbon material. In another aspect, the amount of fibrous polymer material present is sufficient to form a network and/or entanglement with all or substantially all of the carbon material. It should be noted that the density, aspect ratio, and size of any one or more carbon particles can vary, and as such, the amount of fibrous polymer material required to at least partially entangle the carbon material can vary.

In various aspects, the fibrous polymer material can comprise from about 2 to about 50 wt. %, for example, about 2, 3, 4, 5, 8, 10, 15, 20, 25, 30, 35, 40, 45, or 50 wt. % of the carbon and fibrous polymer composition. In other aspects, the fibrous polymer material can comprises less than about 2 wt. % or greater than about 50 wt. % of the carbon and fibrous polymer composition. In other aspects, the ratio of carbon to fibrous polymer material can be from about 20:1 to about 1:20, for example, about 20:1, 18:1, 15:1, 12:1, 9:1, 6:1, 3:1, 1:1, 1:3, 1:6, 1:9, 1:12, 1:15, 1:18, or 1:20; or from about 12:1 to about 6:1, for example, about 12:1, 11:1, 10:1, 9:1, 8:1, 7:1, or 6:1. In other aspects, the ratio of carbon to fibrous polymer material can be greater than about 20:1 or less than about 1:20 and the present disclosure is not intended to be limited to any particular ratio or concentration of fibrous polymer material.

Fibrous polymer materials are commercially available and one of skill in the art could readily select an appropriate fibrous polymer material for use in the methods of the present disclosure.

The carbon material of the present disclosure can comprise any carbon material suitable for use in, for example, an electrode. In various aspects, a carbon material can comprise a carbon black, acetylene black, activated carbon, graphitic material, amorphous carbon, or a combination thereof. In one aspect, the carbon material comprises activated carbon and/or a mixture of activated carbon and carbon black in, for example, a 90:10 or 80:20 ratio. In another aspect, the carbon material comprises an amorphous carbon. In other aspects, the carbon material comprises any one or more carbon material that are at least minimally electrically conductive. In another aspect, the carbon material can comprise other components, such as, for example, an additive, binder, modifier, coating, processing aid, or a combination thereof.

The carbon material of the present disclosure can comprise any suitable form and/or morphology for use in the intended application of the resulting composition. If a carbon material or a portion thereof comprises a powder, it is not necessary that the powder be free flowing or exhibit any particular bulk property. In another aspect, any one or more individual portions and/or particles of the carbon material can have any aspect ratio suitable for use in the methods of the present disclosure. In a specific aspect, the carbon material or at least a portion thereof has an aspect ratio suitable for being at least partially entangled in the fibrous polymer material after contacting. In various aspects, a carbon material or a portion thereof can have a particle size and/or an average particle size of from about 0.1 µm to about 100 µm, for example, 0.1, 0.2, 0.3, 0.5, 1.0, 1.1, 1.2, 1.3, 1.5, 2, 3, 4, 5, 8, 10, 12, 14, 16, 18, 20, 25, 30, 35, 40, 45, 50, 55, 60, 65, 70, 75, 80, 85, 90, 95, or 100 µm; or from about 1 µm to about 50 µm, for example, 1, 2, 3, 4, 5, 6, 7, 8, 9, 10, 12, 14, 16, 18, 20, 25, 30, 35, 40, 45, or 50 µm. In other aspects, a carbon material or a portion thereof can have a particle size and/or average particle size of less than about 0.1 µm or greater than about 100 µm, and the present disclosure is not intended to be limited to any particular size and/or average size.

The carbon material of the present disclosure can be present in any suitable amount depending on the specific components utilized and the intended application of the resulting composition. In one aspect, the amount of carbon material present is an amount capable of being entangled or at least partially entangled in the fibrous polymer material after contacting. In various aspects, the carbon material can comprise from about 2 to about 50 wt. %, for example, about 2, 3, 4, 5, 8, 10, 15, 20, 25, 30, 35, 40, 45, or 50 wt. % of the carbon and fibrous polymer composition. In other aspects, the fibrous polymer material can comprises less than about 2 wt. % or greater than about 50 wt. % of the carbon and fibrous polymer composition. In other aspects, the ratio of carbon to fibrous polymer material can be from about 20:1 to about 1:20, for example, about 20:1, 18:1, 15:1, 12:1, 9:1, 6:1, 3:1, 1:1, 1:3, 1:6, 1:9, 1:12, 1:15, 1:18, or 1:20; or from about 12:1 to about 6:1, for example, about 12:1, 11:1, 10:1, 9:1, 8:1, 7:1, or 6:1. In other aspects, the ratio of carbon to fibrous polymer material can be greater than about 20:1 or less than about 1:20 and the present disclosure is not intended to be limited to any particular ratio or concentration of carbon material.

Carbon materials are commercially available and one of skill in the art could readily select an appropriate carbon material for use in the methods of the present disclosure.

In a first step of the various methods of the present disclosure, a carbon material and a fibrous polymer material are contacted. In one aspect, at least a portion of the carbon material and at least a portion of the fibrous polymer material are mixed. In another aspect, all or substantially all of each of the carbon material and the fibrous polymer material are mixed. In various aspects, a mixing step, if performed, can comprise any degree of mixing necessary to provide a carbon and fibrous polymer composition having properties suitable for the intended application. In a specific aspect, a carbon material and a fibrous polymer material are mixed in, for example, a ball mixer for a period of time so as to entangle at least a portion of the carbon material into the fibrous polymer material. In various specific aspects, the period of time of a mixing step, if performed, can vary, and can range, for example, from about 10 seconds to about 2 hours. In other aspects, the period of time of a mixing step, if performed, can be less than about 10 seconds or greater than about 2 hours, depending on the specific components utilized and the intended application of the resulting composition. Similarly, the type of mixing and forces, for example, shear force, applied therein, can vary. In one aspect, a carbon material and a fibrous polymer material can be mixed in a ball mill with, for example, agate media, at a speed of from about 10 to about 1,000 rpm, for example, about 10, 20, 50, 100, 200, 300, 400, 500, 700, 900, or 1,000 rpm; from about 200 to about 500 rpm, for example, about 200, 250, 300, 350, 400, 450, or 500 rpm; or from about 300 to about 400 rpm, for example, about 300, 310, 320, 330, 340, 350, 360, 370, 380, 390, or 400 rpm.

In one aspect, the step of contacting the carbon material and the fibrous polymer material is performed without any liquid present. In another aspect, at least one of the carbon material and the fibrous polymer material are dry or substantially dry when contacted. In yet another aspect, both the carbon material and the fibrous polymer material are dry or substantially dry when contacted, and the contacting step is performed without the addition of liquid.

Other contacting and/or mixing techniques, such as, for example, stirring, milling, ball milling, and media mill dispersion can be utilized in addition to or in place of any specific contacting and/or mixing technique disclosed herein.

After contacting, at least a portion of the carbon material can be entangled in at least a portion of the fibrous polymer material. In one aspect, such an entanglement can form a network. In another aspect, at least a substantial portion of the carbon material is entangled within a network of the fibrous polymer material so as to not be free flowing during, for example, handling of the composition.

A second step of the methods of the present disclosure comprises, in various aspects, contacting the mixture of carbon material and fibrous polymer material with a liquid. The liquid can be any liquid suitable for use in the methods described herein. In one aspect, the liquid comprises a polar dispersing medium, a non-polar dispersing medium, or a combination thereof. In another aspect, the liquid has a vapor pressure and/or a boiling point that can enable facile removal of all or at least a portion thereof from a mixture by, for example, evaporation. In a specific aspect, the liquid comprises isopropanol. In another aspect, the liquid comprises isopropanol and water.

The amount of liquid contacted with the mixture of carbon and fibrous polymer material can vary depending on such factors as the specific components and properties thereof (e.g., surface area of a carbon material), chemical compatibility, desired level of dispersion, and intended application of the resulting composition. In one aspect, the amount of liquid present be a weight ratio of from about 10:1 to about 1:10 of solid to liquid, for example, about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9 or 1:10; or from about 1:2 to about 1:4, for example, about 1:2, 1:3, or 1:4. In a specific aspect, the amount of liquid present comprises a weight ratio of about 1:3 solid to liquid.

In one aspect, the liquid and mixture of carbon and fibrous polymer material can optionally be subjected to an additional mixing step, such as, for example, ball milling, for a period of time. In one aspect, and while not wishing to be bound by theory, the addition of a liquid, such as, for example, isopropanol to the mixture of carbon and fibrous polymer material, can assist in dispersing the carbon material and fibrous polymer material. In various aspects, the addition of liquid to the mixture of carbon and fibrous polymer material can provide a high level of dispersion and/or provide a uniform or substantially uniform dispersion of carbon and fibrous polymer material within the liquid.

After contacting with a liquid, the resulting mixture of carbon, fibrous polymer material, and liquid can be formed into a layer. A layer of such a resulting mixture can comprise any suitable thickness and/or geometry for an intended application. In one aspect, a layer comprises a ribbon like form of the resulting composition.

The mechanism of forming a layer of the resulting mixture can vary depending on the intended application. In one aspect, the resulting mixture can be extruded. In another aspect, the resulting mixture can be spread by mechanical means and/or automated means. In one aspect, the layer or at least a portion thereof can comprise a uniform or substantially uniform thickness, width, and composition. In another aspect, the layer or at least a portion thereof can comprise a gradient of at least one of thickness, width, composition, or a combination thereof. In yet another aspect, at least one of thickness, width, and/or composition can vary, for example, randomly, across any portion of the layer.

The step of forming a layer of the resulting mixture can optionally comprise depositing at least a portion of the resulting mixture onto a substrate. A substrate, if used, can comprise any material and dimensions suitable for use in an intended application. In one aspect, a substrate comprises an absorbent medium. In a specific aspect, a substrate comprises a porous medium, such as, for example, a paper tape. In another aspect, a substrate is capable of absorbing at least a portion of the liquid from the resulting mixture. In yet another aspect, a substrate is capable of absorbing all or substantially all of the liquid from the resulting mixture.

In one aspect, a portion of the resulting mixture can be spread onto a portion of a substrate. In a further aspect, a second substrate comprising the same or a different composition and dimensions can be positioned on the surface of the spread mixture not in contact with the substrate. In such an aspect, the substrate and second substrate can be positioned in at least partially overlying registration with a portion of the spread mixture disposed therebetween.

After depositing a portion of the resulting mixture onto a substrate and an optional second substrate, the laminated composition can optionally be pressed and/or subjected to a mechanical treatment, such as, for example, a roller, to impart or adjust at least one physical property thereof. In one aspect, a mechanical roller can be utilized to form a laminated composition having a uniform thickness. In one aspect, a laminated structure can have a thickness of up to about 12 mils, for example, 1, 2, 3, 4, 5, 6, 7, 9, 10, or 12 mils. In a specific aspect, a mechanical roller can be used to form a laminated structure having a thickness of about 5 mils. It should be noted that the specific thickness of any portion of a laminated structure can vary depending on the desired application, and the present disclosure is not intended to be limited to any particular thickness. In another aspect, a pressing and/or mechanical treatment step, if performed, can assist in the absorption of liquid from the carbon and fibrous polymer material layer into the substrate and optional second substrate. An exemplary rolled mixture of carbon and fibrous PTFE polymer is illustrated in the electron micrograph of FIG. 1.

In another aspect, at least one current collector can be utilized and can form a portion of the laminated structure. In a specific aspect, a current collector can be positioned in contact with at least a portion of the resulting mixture. A current collector, if used, can comprise any suitable material. In one aspect, a current collector comprises aluminum. In another aspect, a current collector comprises a graphite coated aluminum material. Current collectors and current collector materials are commercially available and one of skill in the art could readily select an appropriate current collector and/or current collector material.

In a specific aspect, both the substrate and second substrate are paper, which can be later removed such that the mixture deposited and/or positioned between the substrate and the second substrate can be, for example, rolled onto a current collector. In another specific aspect, at least one of the substrate or second substrate can be paper and the remaining substrate a current collector. In yet another specific aspect, at least one of the substrate or second substrate can be a current collector and the remaining substrate a separator. It should be noted that references to a substrate and/or a second substrate, if present, can be utilized interchangeably, and any particular method step comprising, for example, depositing onto a substrate, can comprise, for example, deposition onto a second substrate.

In yet a further aspect, a laminated structure comprising a current collector can optionally be subjected to a rolling treatment, for example, between two rollers, to, for example, create and/or improve adhesion between the carbon and fibrous polymer material electrode and the one or more current collectors.

An electrode prepared from the carbon and fibrous polymer material of the present disclosure can exhibit more stable thermal and mechanical properties under, for example, operating conditions, than conventionally prepared electrodes. In other aspects, an electrode prepared in accordance with the various methods described herein can provide one or more performance advantages when used in an electrical device. The methods described herein can also provide one or more advantages over conventional preparation methods, such as, for example, improved dispersion of carbon, uniform or substantially uniform electrode structures, effective utilization of carbon, low internal and contact resistance for an electrode, no requirement to heat the composition to sinter PTFE particles, good adhesion between electrode materials and a current collector, or a combination thereof.

An electrode prepared in accordance with the methods of the present disclosure can be utilized in any suitable electrical device, such as, for example, an electric double layer capacitor. Electrodes manufactured as described herein can be incorporated into EDLC's with enhanced energy density and specific power. As previously discussed, EDLC's can include any device configured to store a charge including, for example, standard jelly roll designs, prismatic designs, honeycomb designs, hybrids (e.g., one electrode is carbon and the other electrode is a pseudo capacitance material such as a metal oxide, conducting polymers or others), supercapacitors, ultracapacitors or other designs known in the art. Moreover, EDLC's utilizing the carbon materials described herein can be constructed through any variety of conventional processes. The electrodes can optionally be impregnated in an electrolyte solution. The electrolyte solution may include: i) a salt (i.e., $Me_3EtN^+$, $MeEt_3N^+$, $EtN^-$, $BF_4^-$, $PF_6^-$) or others known in the art dissolved in the organic liquid (i.e., Acetonitrile (AN), Propylene Carbonate (PC)), ii) a salt in an aqueous liquid (i.e., KOH or inorganic acids such as $H_2SO_4$) or iii) ionic liquids (i.e., TEA-TFB) and other electrolytes known in the art. The electrodes can be in contact with and between two metallic current collectors. In the case of a fluid or compressible electrolyte, a separator or spacer, permeable by the electrolyte, can be interposed between the electrodes to prevent shorting.

As expressed in the examples below, EDLC's assembled with electrodes including carbon materials manufactured by the processes contemplated herein can result in EDLC's having energy densities of at least about 9 Wh/l and as high as in the range of, for example, about 14-16 Wh/l or greater. Such EDLC's can also have a specific power of greater than about 3,000 W/kg and can exceed more than 7,000 W/kg.

Although several aspects of the present invention have been described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the compositions, articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Preparation of Laminate Structure

In a first example, a laminate structure was prepared from a PTFE material and a carbon material in accordance with the present disclosure. The carbon material can be made from the methods described in U.S. Patent Publication No. 2008/0024954, which is hereby incorporated by reference in its entirety and specifically disclosing carbon materials and method for making the same. A PTFE high aspect ratio material and a carbon material were mixed in a 9:1 ratio (carbon:PTFE) and then subjected to milling with agate media at about 340 rpm for about 10 minutes so as to allow mechanical incorporation of carbon particles into the PTFE material. Isopropyl alcohol was subsequently added to the mixture so that a solid to liquid proportion of about 1:3 was obtained. The mixture was then milled again at about 340 rpm for about 10 minutes to obtain a thick paste. The paste was then spread onto a paper substrate and covered with another paper substrate. The paper and paste composition was then rolled with a mechanical roller. The isopropanol was partially absorbed in the paper and a thin tape was obtained. The tape was rolled multiple times between rollers to control the thickness and reduce it down to 5 mil thickness. Two such tapes were made and a commercially available (Intellicoat) aluminum current collector coated with graphite was placed between the two tapes and the assembly was rolled between two rollers to create adhesion between the electrode tapes and the current collectors. The electrode thus formed showed excellent uniformity and good adhesion of the tapes to the current collector. The adhesion of the tape to the current collector was checked via immersing the electrode tape in an electrolyte solution of TETA-TFB in acetonitrile for five days. The immersion test did not result in delamination of the tape form the current collector or separation of the carbon particles form the tape. The bond between the tape and current collector remained strong.

From this electrode, button cell samples were fabricated to measure energy density and ESR to evaluate the performance of the electrode. The energy density obtained was 17 Wh/l and the ESR was 0.8 ohms. These performance numbers indicate that the electrode is working well.

Example 2

Alternative Preparation of Laminate Structure

In a second example, an alternative preparation method was utilized to prepare a laminate structure. The process described in Example 1, above, was utilized to prepare a laminate structure except that the liquid medium utilized was a 2:1 weight ratio of isopropanol to distilled water. This process also worked well and processed as well as the electrode in example 1. The energy density and ESR properties were respectively 16.5 Wh/l and 1 ohm again indicating excellent performance.

Example 3

Second Alternative Preparation of Laminate Structure

In a third example, an alternative preparation method was utilized to prepare a laminate structure. The process described in Example 1, above, was utilized to prepare a laminate structure except that the solids contained an activated carbon material and carbon black in an 8:1 ratio. The activated carbon material can be made according to the methods described in U.S. Patent Publication No. 2008/0024954, which is hereby incorporated by reference in its entirety and specifically for the purpose of disclosing a carbon material and methods for making the same. The PTFE was added again in a ratio of 8:1:1 carbon:carbon black:PTFE. The electrodes fabricated via this process showed energy density of 17 Wh/l and ESR of 1 ohm. This example indicates that the electrode may contain conductivity enhancing additives.

Example 4

Third Alternative Preparation Method

In a fourth example, a method for preparing a laminate structure was scaled. A mixture of PTFE and carbon were processed in a mill dry and then mixed with a liquid to form a slurry as described above. The slurry was then processed between two absorbent substrates to form a preform which was rolled further to control the electrode tape thickness, width and other parameters. After first rolling between the absorbent substrates, the subsequent rolling was carried out between, for example, metal foils and/or plastic films. The tapes were then rolled onto a metallic current collector to mechanically adhere the tape to current collector.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method is selected from the group consisting of:
    a) contacting a fibrous polymeric material and a carbon material without any liquid present to form a network of fibrous polymeric material in which the carbon material is entangled;
    b) contacting the network formed in a) with a liquid to form a slurry; and then
    c) depositing at least a portion of the slurry onto a substrate to form a layer comprising the slurry.

2. The method of claim 1, wherein the contacting in b) comprises ball milling.

3. The method of claim 1, further comprising positioning a second substrate in at least partial overlying registration and oppositely disposed from the substrate to form a laminated structure.

4. The method of claim 3, wherein at least one of the substrate, the second substrate, or a combination thereof comprises an absorbent material.

5. The method of claim 3, wherein at least one of the substrate, the second substrate, or a combination thereof comprise paper.

6. The method of claim 3, wherein at least one of the substrate or the second substrate comprises paper, and wherein at least one of the substrate or the second substrate comprises a current collector.

7. The method of claim 3, wherein at least one of the substrate or the second substrate comprises a current collector, and wherein at least one of the substrate or the second substrate comprises a separator.

8. The method of claim 3, further comprising rolling the laminated structure.

9. The method of claim 1, wherein the fibrous polymeric material comprises a plurality of individually divided fibers.

10. The method of claim 1, wherein the fibrous polymeric material comprises no agglomerates.

11. The method of claim 1, wherein the fibrous polymeric material comprises polytetrafluoroethylene.

12. The method of claim 1, wherein the liquid comprises isopropanol.

13. The method of claim 1, wherein the carbon material comprises carbon black, graphite, acetylene black, activated carbon, or a combination thereof.

14. The method of claim 1, wherein the carbon material comprises a composition formed from an uncured, synthetic, non-graphitizable carbon precursor.

15. A method for forming an electrode for use in a double-layer device, the method comprising:
    mixing a dry fibrous polymeric material with a dry carbon material in the absence of any liquid to form the dry fibrous polymeric material into an interconnected network in which the dry carbon material is entangled;
    contacting the interconnected network with a solvent to form a slurry;
    depositing the slurry onto a first substrate;
    positioning a second substrate in at least partial overlying registration and oppositely disposed from the first substrate to form a laminated structure; and
    rolling the laminated structure to a desired thickness and to remove excess solvent from the slurry thereby forming the interconnected network into an electrode, wherein at least one of the first substrate and the second substrate is an absorbent medium.

16. The method of claim 15, wherein the dry fibrous polymeric material comprises a plurality of individual fibers comprising an aspect ratio greater than 1.

17. The method of claim 15, wherein the dry carbon material comprises carbon powder with an average particle size from about 0.1 micron to about 100 microns.

18. The method of claim 15, wherein at least one of the first substrate and the second substrate is a current collector.

19. The method of claim 15, wherein at least one of the first substrate and the second substrate is a separator.

20. The method of claim 15, further comprising:
removing the first substrate and the second substrate from the electrode; and
rolling the electrode onto a current collector.

\* \* \* \* \*

UNITED STATES PATENT AND TRADEMARK OFFICE
CERTIFICATE OF CORRECTION

PATENT NO. : 8,002,921 B2  
APPLICATION NO. : 12/129208  
DATED : August 23, 2011  
INVENTOR(S) : Kishor Purushottam Gadkaree et al.

Page 1 of 1

It is certified that error appears in the above-identified patent and that said Letters Patent is hereby corrected as shown below:

In the Claims

| No. | Col. | Line | Description |
|---|---|---|---|
| 1 | 12 | 2 | 1. A method is selected from the group consisting of: should read A method comprising: |

Signed and Sealed this
First Day of September, 2015

Michelle K. Lee
*Director of the United States Patent and Trademark Office*